Nov. 1, 1932.  A. McMULLEN  1,886,114
TRAP
Filed June 28, 1930  7 Sheets-Sheet 1

Nov. 1, 1932.  A. McMULLEN  1,886,114
TRAP
Filed June 28, 1930  7 Sheets-Sheet 7

Allen McMullen
INVENTOR
BY Victor J. Evans
ATTORNEY

Patented Nov. 1, 1932

1,886,114

UNITED STATES PATENT OFFICE

ALLEN McMULLEN, OF NUMBER FOUR, NEW YORK

TRAP

Application filed June 28, 1930. Serial No. 464,596.

This invention relates to animal traps of the type particularly adapted for trapping fur bearing animals of practically any kind or size.

The primary object of the invention is to enable the trap to function in a humane manner; that is to say, so that the victim will either be imprisoned within the trap without sustaining bodily injury, or else executed practically instantaneously.

Another object of the invention is to construct animal traps of the aforesaid humane type which will be capable of seizing and securely holding the victim without damaging the pelt.

Still another object is to construct a trap of the trigger-actuated spring-closing jaw type which may be set with facility, the jaws being freely movable after the trap has been set, so that the jaws may be positioned any desired distance apart for use in a path or runway frequented by the animal.

A further object of the invention is to construct a trap of the trigger-released spring jaw type in which the jaws will be securely locked in their closed position with the victim held therebetween against possibility of extricating itself.

A still further object is to construct a trap so that it may be instantly sprung by release of a trigger associated with a pan or platform located between the jaws, the trigger including a safety device whereby the trap will be held against accidental opening during transportation to the point of use.

A still further object is to provide a trap of the aforesaid general character which includes features of adjustability whereby the pan or platform may be located at a distance from the trigger mechanism, thereby to accommodate the trap to animals of different sizes.

Still another object is to construct the trap so that animals of small size, such for instance as immature muskrats or other small animals, will not be caught even though they may spring the trap.

Yet another object is to construct the trap with double acting jaws whereby, for instance, when a relatively large or long-legged animal, such as a fox, wolf, or lynx has sprung the trap, the trap will accommodate itself to the natural leaping movement of the animal away from the trap, by bringing into play an auxiliary pair of jaws or impaling members which are arranged to close upon the body of the animal at a higher elevation, these auxiliary jaws or impaling members, as they are released for action, being adapted to function as risers, causing the entire trap to spring upward from the surface of the ground to meet the body of the victim.

Still another object is to simplify and improve the construction of animal traps generally and to provide efficient and positively acting trap constructions which may be made in various sizes for various types of animals, the construction permitting traps of the larger sizes to enable immature or baby animals to escape without injury while traps designed for animals of relatively small size will practically instantly kill such smaller animals, but if sprung by a larger or longer-legged animal, will securely hold such animal without killing the victim.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show embodiments of the invention as at present preferred.

Referring particularly to the drawings by reference characters, the numeral 10 designates a base plate of the trap, the front and rear portions of which are formed with vertical flanges 11, 12 while immediately in rear of the front flange and rigid with the base is another vertical flange 13. The flanges 11, 12 carry thereon rods 14, 15, and the flanges 11 and 13 carry therebetween pivots 16, 17; and while the rods 14, 15 have pivoted thereon arms 18 and 19, and the said pivots jaws 20 and 21, the said rods also carry torsion springs 22, 22'. Extending forwardly from the flange 13 is a projection or arm, which terminates in a hinge pin 23. Also rigid with the base 10 is a pair of ears, each alike and designated 24, which, provided with apertures, as shown, pivotally accommodate opposed terminals of a dog 25, the central end of which is provided with an aperture 26.

In order to properly operate on their respective pivots, the jaws 20 and 21 are provided with terminals 27 and 28. As the rear ends of the respective springs 22, 22' abut the base plate, and the forward ends 29, 30 of the said springs contact with the arms 18, 19 the result is that these springs, which are placed under stress, urge the said arms to a closed position; but since these arms are swingable on their pivots, and as the dog 25 holds the said arms extended, as shown, for instance, in Fig. 1, the trap is securely locked in the open position by engagement of a finger 31 in the aperture 26 of the dog.

Figure 3:
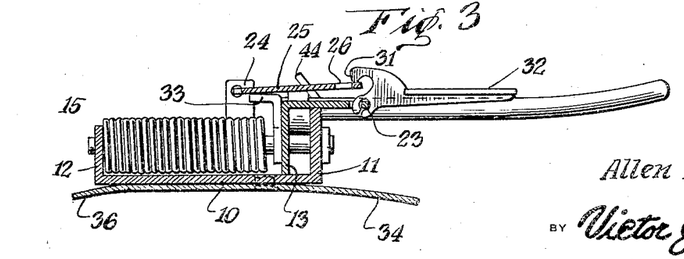
Fig. 3 is a vertical sectional view taken substantially on the line 3—3 of Fig. 1.

This finger is part of an operating lever, a plate 32 of which forms a tread for an animal; that is to say by treading on the plate an animal operates the structure. This lever is pivoted on the pin 23. In the locked position of the trap, just referred to, the device is quite safe for manipulation, or for being carried in any convenient way; but the trap is shown in the set or operative position, as in Fig. 3, with the finger 31 slidably contacting with the dog, in front of the aperture 26.

In order to urge the dog 25 clear of the jaws, as the latter are swung to the closed position by the springs, the arms 18, 19 are each provided with an ear as at 33. The trap is provided with a base spring 34, a pair of terminals 35, 36 of which are suitable for inserting in any structure, such as a log, it being appreciated that the trap shown in Fig. 1 to 4a is appropriate for small animals, of the muskrat or weasel type, for instance. By cutting a recess, with a vertical boundary edge, in a log or the like, and placing the trap in the recess with the top of the trap or the plate 32 about level with the top of the log, and with the terminals 35, 36 in the vertical edge, the trap is inconspicuous or concealed, and the said terminals hold the trap in its position.

Figures 1, 2, 4, 4A:
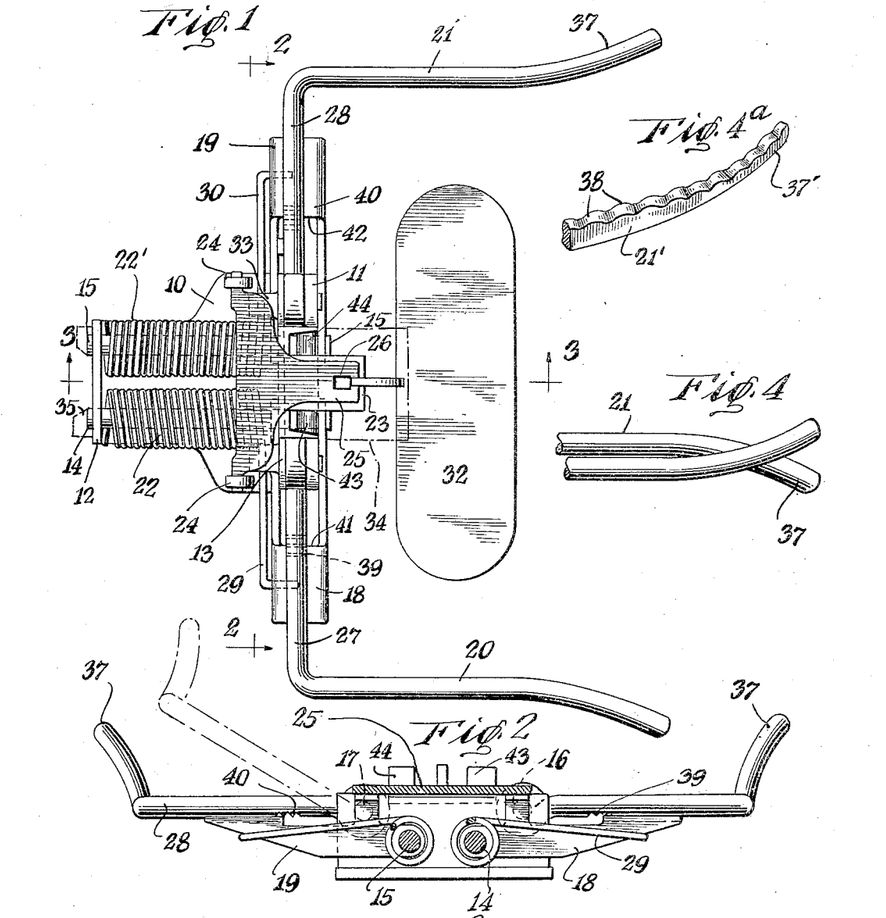
Fig. 1 is a top plan view of one form of trap constructed according to this invention, in its set position.
Fig. 2 is a front elevation, partly in section along the line 2—2 of Fig. 1.
Fig. 4 is a partial top plan view illustrating jaws of one type in their closed position.
Fig. 4a is a partial perspective view illustrating another jaw construction.

In action, the jaws 20, 21 grip the body of the animal and, the springs 22, 22' being sufficiently strong, kill the animal instantaneously, without injuring the pelt. The jaws are provided with guard terminals as at 37, which are shown in crossed relation in Fig. 4, to properly place the body of the animal during the gripping operation. Fig. 4a shows a modified form of structure, in which the jaw 21', as well as the terminal 37', are waved or provided projections 38 and interposed recesses.

In order to positively secure the jaws in the engaged position on the animal, and to prevent any backward movement against the action of the springs, the terminals 27, 28 of the jaws have therein notches, as at 39, 40, in which edges 41, 42 of the arms engage. In a small trap, when the thumbs of an operator are placed on the ends of the arms 18, 19, the flange 12 being at the rear part of the hands of the operator, the dog 25 may be swung into the forward position, and the fore fingers of the hands moved under the said jaws to manipulate the lever or plate 32 for setting the trap. With a large trap, when the springs are very strong, keys or attachable arms are used on the ends of the arms 18, 19, during the opening operation.

A very light pressure or weight operates the lever or plate 32. As it is not desirable to trap a very small or baby animal, such an animal escapes, even after operating the lever, since the jaws then meet above the small animal; but with a larger animal the trap jaws strike or meet the animal high on the body. Since the pivots 16, 17 are spaced apart, as seen in Fig. 2, a small animal also escapes between the lower parts of the terminals 27, 28, when such small animal springs the trap, say with its fore feet, and with the rear end of its body at or near the pivots. It will be seen that as an animal advances on the trap from the sides or in a fore and aft direction, either the jaws 20, 21 or their terminal strike or catch the animal.

Since the jaws are freely movable when the trap is set, and as many animals follow beaten tracks or runways, which are therefore raised along the sides, the trap suitably fits in such runways, with the jaws in any appropriate raised position (see Fig. 2). Lugs or stops 43, 44 are formed on the flange 11, and these stops may be disposed at any angle to arrest the terminals 27, 28 and therefore the jaws 20, 21, so that the latter may, when so desired, be spaced apart in the closed position, to limitedly crush or grip the body of the animal. This feature is also effective when large or long legged animals frequent localities in which small traps are set, since it is not desirable to catch a leg of a large animal in a small trap, as such an action would only injure the large animal without effecting capture, and would also result in loss of the trap. Therefore, the stops, as at 43, 44, on such occasions, arrest the jaws of the trap in spaced relation to allow the leg or foot of a large animal to leave the trap, after springing the same.

Figures 5, 6:
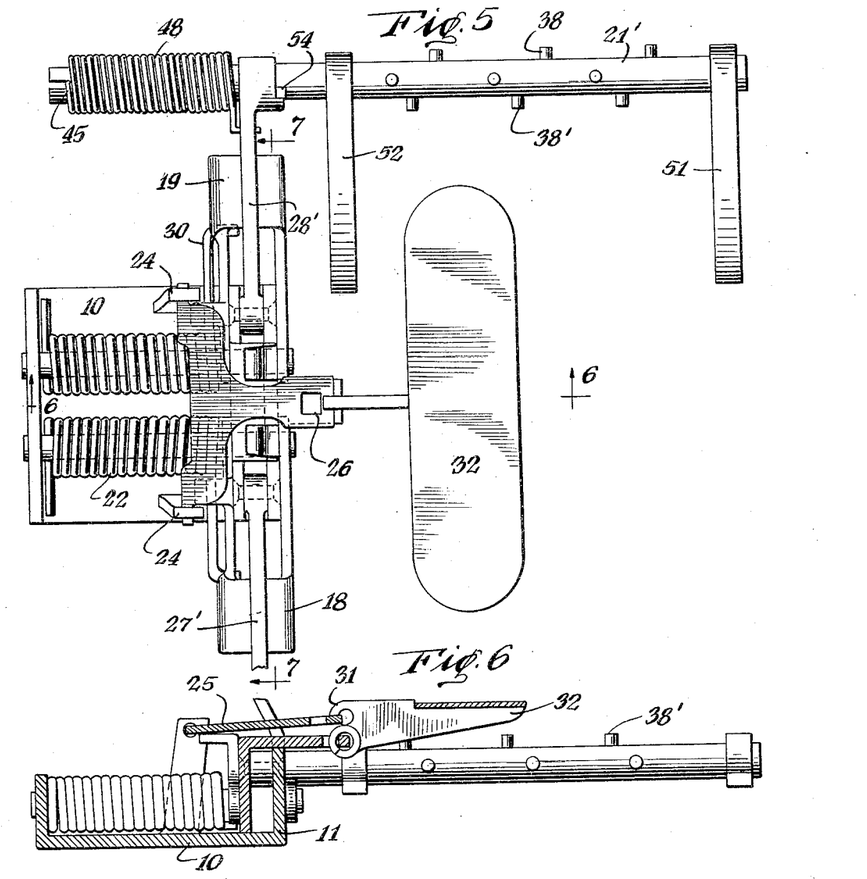
Fig. 5 is a top plan view of another form of the trap incorporating substantially the features of the form shown in Fig. 1, but including double acting spring jaws.
Fig. 6 is a vertical sectional view substantially along the line 6—6 of Fig. 5, looking in the direction of the arrows.
Figure 7:
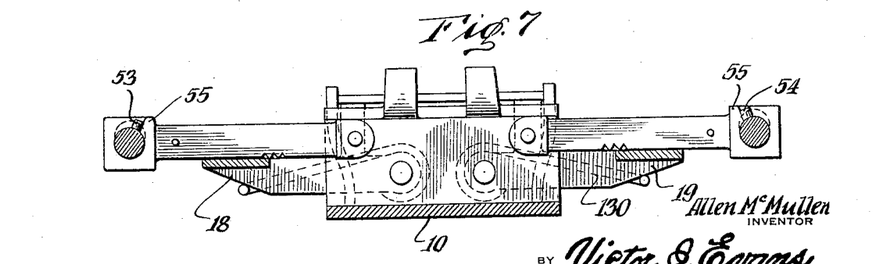
Fig. 7 is a rear elevation, partly in section taken along the line 7—7 of Fig. 5.

In Figs. 5 to 7 the base 10 and structures mounted thereon are the same as those already described, except that the terminals 27', 28' have turnably mounted in hubs, formed on the ends of said terminal jaws 20', 21'. These turnable jaws have fast with the outer ends thereof at, 45, 46, the terminals of torsion spring 47, 48, the inner terminal of which rest against the jaw terminals 27', 28', so that on turning the jaws 20', 21', as by auxiliary jaws 49, 50, 51, 52, the turnable jaws are placed under releasable stress, there being pins 53, 54 on the latter jaws which engage in shoulders or stops, as at 55, of the terminals 27', 28'.

Figures 8, 9, 10, 11, 12, 13, 14:
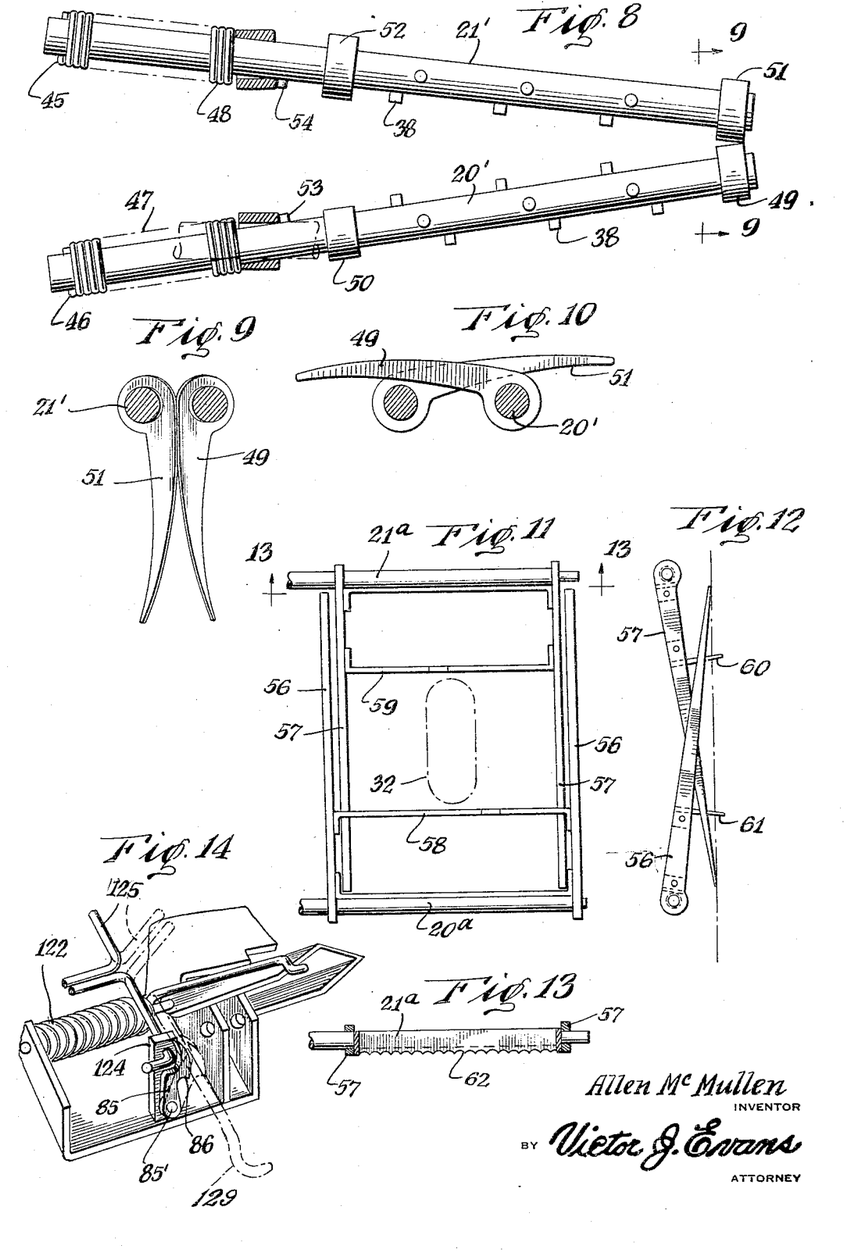
Fig. 8 is a top plan view illustrating the operation of the double acting spring jaws designed for use in trapping long-legged animals.
Fig. 9 is a transverse sectional view along the line 9—9 of Fig. 8 illustrating the position of auxiliary or imprisoning jaws at the instant the trap has been sprung and just prior to closing upon the body of the victim.
Fig. 10 is a view similar to Fig. 9 showing the imprisoning jaws in their operative position brought about by the closing of the main jaws.
Fig. 11 is a top plan view illustrating another form of the invention particularly designed for large animals, wherein the trap includes auxiliary jaws, with impaling members, so arranged that the trap will spring from the surface of the ground to meet the body of the victim.
Fig. 12 is an end elevation of the trap shown in Fig. 11.
Fig. 13 is a detail sectional view taken on the line 13—13 of Fig. 11 illustrating the construction of the rotatable main jaws which carry the auxiliary jaws or impaling members.
Fig. 14 is a detail perspective view showing a preferred form of spring locking and releasing mechanism particularly adapted for traps of large size.
Figure 15:
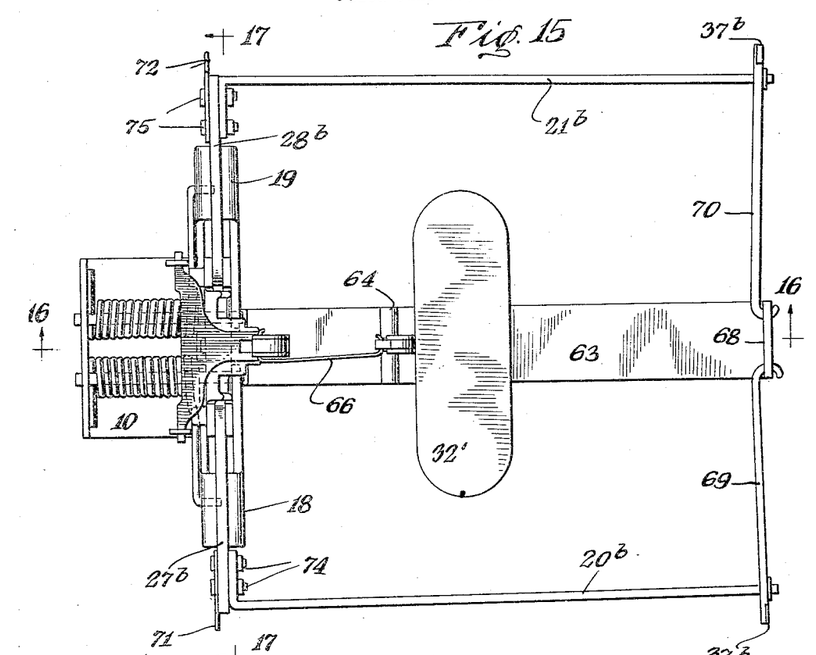
Fig. 15 is a top plan view of another form of the invention.

The trap is shown in the set position in Fig. 5, following which, on actuation of the lever or pan 32 by an animal, the turnable jaws first assume the position shown in Fig. 8, just prior to finally closing on the animal. During the final closing movement the jaws owing to gripping the animal, are moved into parallel relation, whereupon the pins 53, 54 are released from the retaining shoulders, it being noted that the turnable jaws are rather loosely mounted in the hubs. On release of these pins the springs 47, 48 instantly act to urge the auxiliary jaws 49–52 into contact with the animal. Fig. 10 shows a pair of auxiliary jaws in one engaged position, after release of the torsion springs. The turnable jaws have thereon, in this case, knobs or knurls, to render the striking movement of the jaws more effective to instantly kill the animal, without injuring the pelt.

Figure 16:
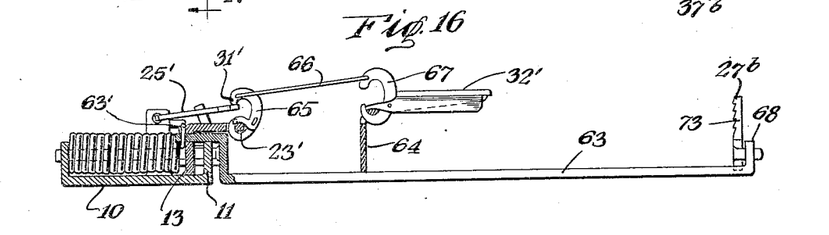
Fig. 16 is a horizontal sectional view on the line 16—16 of Fig. 15.
Figure 17:
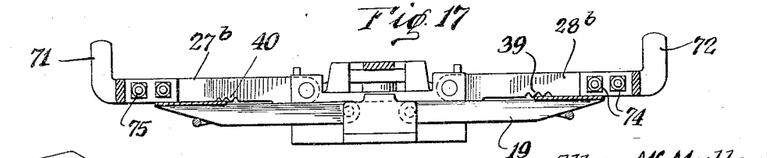
Fig. 17 is a vertical sectional view on the line 17—17 of Fig. 15.
Figure 18:
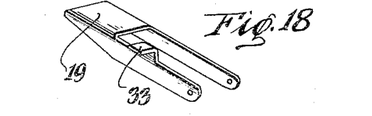
Fig. 18 is a perspective of an arm per se.
Figure 19:
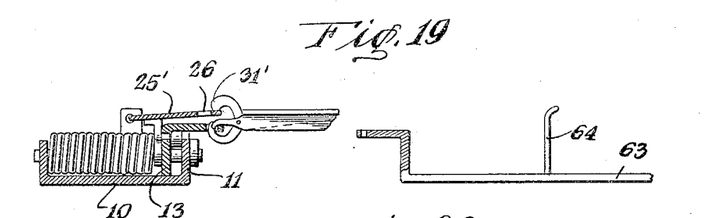
Fig. 19 is a fragmentary sectional view, like the view shown in Fig. 16, but showing some of the parts in separate relation.

In Fig. 11, in which the structure is particularly adapted for trapping large animals, of the lynx or wolf type, the turnable jaws 20a, 21a fixedly carry frames 56, 57, the inner members 58, 59 of which carry prong or bayonet projections 60, 61, for piercing purposes. These frames are relatively long transversely, so that on release thereof by pins, as at 53, 54, said frames serving to strike an animal's body, immediately following which on completion of the turning movement, the bayonets are driven into the animal's body, the action being therefore instantaneous. The jaws 20a, 21a are preferably formed with teeth 62, which meet the animal low on the body, below the bayonets 60, 61. Held removably rigid, by a split pin 63' with the flanges 11 and 13, as shown in Figs. 16 and 19, is a base extension member 63, on a bridge piece 64 of which a lever or actuating pan 32' is pivoted. While this actuating lever is exchangeable, and may be placed on a hinge pin 23', said pin carries a trigger member 65 on which is a finger 31'; and as a link 66 connects the said trigger, as by the terminal or trigger member 67, movement of the lever 32' actuates the dog 25' to close the jaws 20b, 21b. These jaws are bolted to the terminals 27b, 28b at their rear ends, while their front ends are pivotally connected with the front flange 68 of the base 63 by links 69, 70. While rear guards 71, 72 are provided on these jaws, front guards, as at 37b, which carry teeth 73, are also provided. The jaws of this trap, which will pass over smaller animals, such as a weasel, are suitable for trapping animals of the skunk or opossum type.

Figures 20, 21, 22, 23:
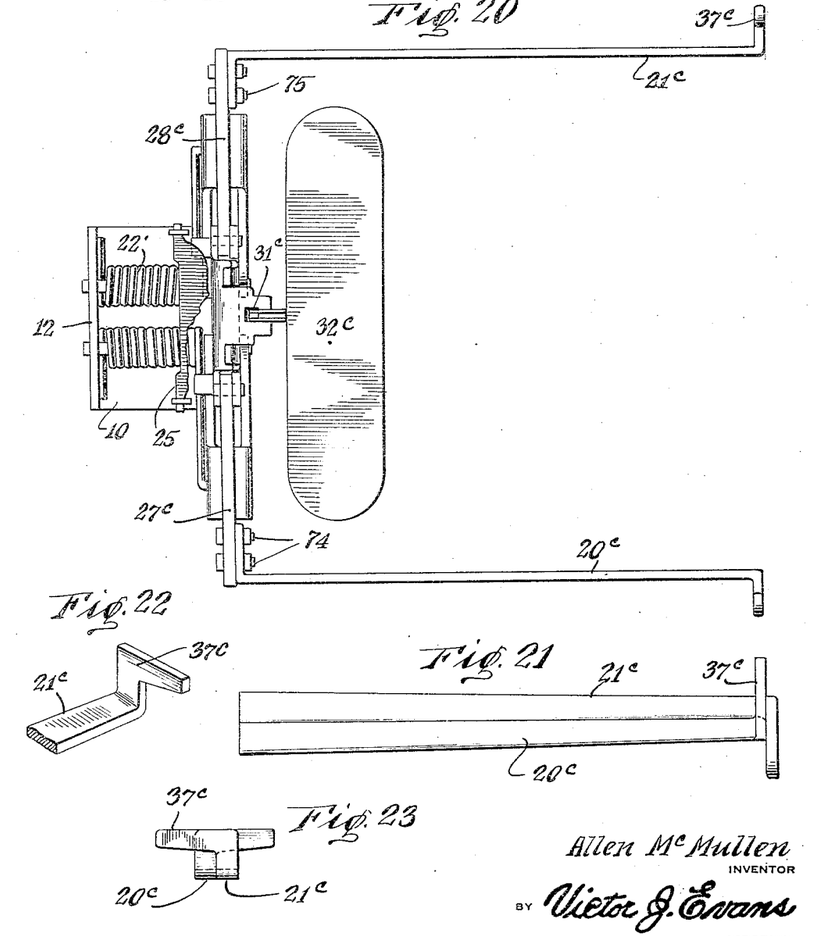
Fig. 20, is a plan view, partly broken away, of another form of trap.
Fig. 21 is a plan view of the jaws of the trap shown in Fig. 20, said jaws being however in closed relation.
Fig. 22 is a perspective of a modified terminal or guard of a jaw.
Fig. 23 is an end elevational view of the jaws shown in Fig. 21.

Fig. 20 shows a trap in which interchangeable jaws 20c, 21c are removably mounted by bolts, as at 74, 75, on pivoted terminals 27c, 28c. In this case the operating lever, including the pan 32c, is also slightly modified, there being a terminal 31c on the lever, which cooperates with the dog 25. While the jaws in this latter case are provided with terminal guards, as at 37c, another modified form of terminal guard 37d is shown in Fig. 22.

Figure 27:
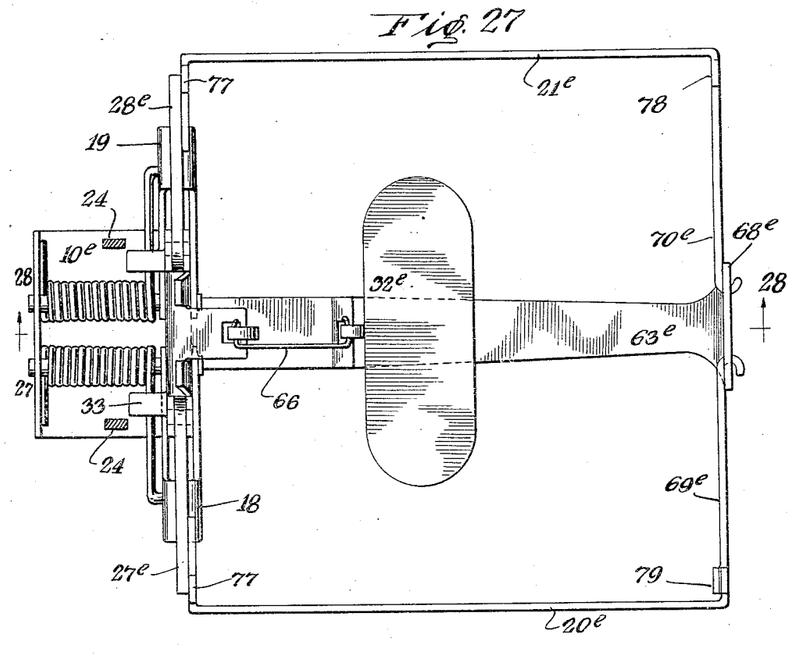
Fig. 27 is a plan view, partly in section, of another modified form of trap.
Figure 28:
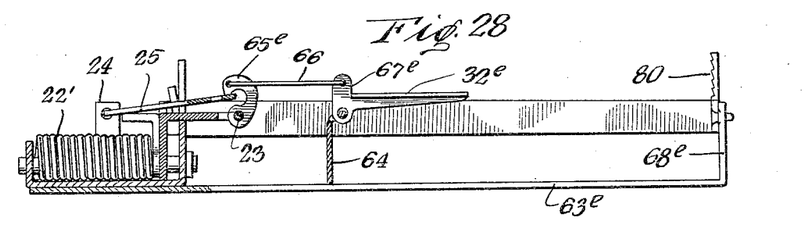
Fig. 28 is a horizontal section taken on the line 28—28 of Fig. 27.
Figure 29:
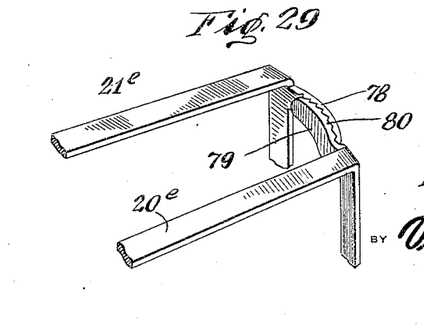
Fig. 29 is a fragmentary perspective of the terminals of the jaws shown in Fig. 27.

As shown in Fig. 27 the base 10e carries therebelow a base 63e on the bridge piece of which an operating lever, including a pan 32e and terminal 67e, is connected by a link with a trigger member 65e, which cooperates with a dog 25 to release arms 18, 19 for actuating jaws 20e, 21e. These jaws are carried by terminals 27e, 28e, and also, by terminals 69e, 70e, which are pivotally connected with a flange 68e of the base extension 63e. The jaws in this case carry rear stops as at 77 and front stops 78, 79, which space the jaws apart, so as to properly meet on the opposite sides of the body of an animal of a predetermined size. These jaws, while permitting escape of a large or long-legged animal that may operate the trap, are held in the closed position on the body of an animal of about the intended size by teeth, as at 80.

Figure 24:
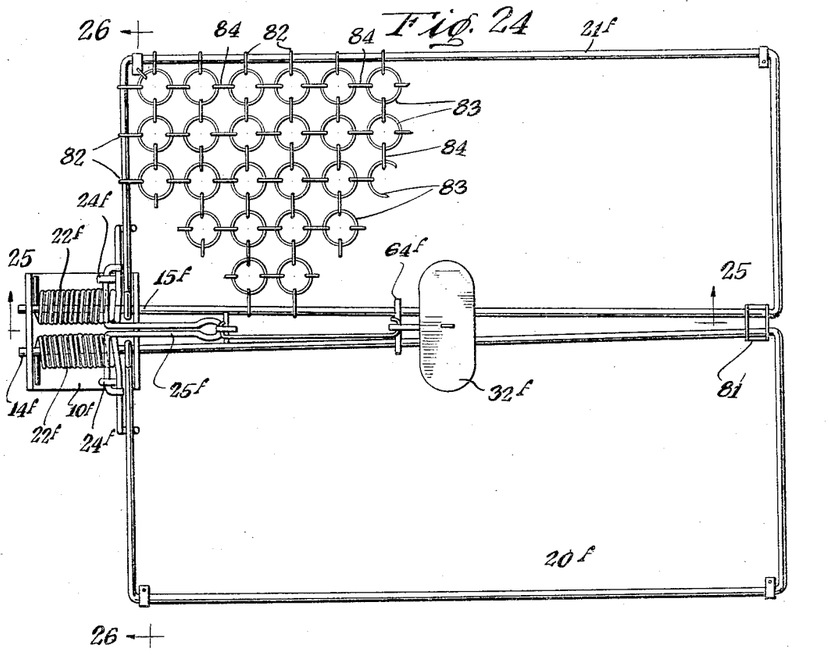
Fig. 24 is a plan view, partly broken away, of another modified form of trap.
Figure 25:
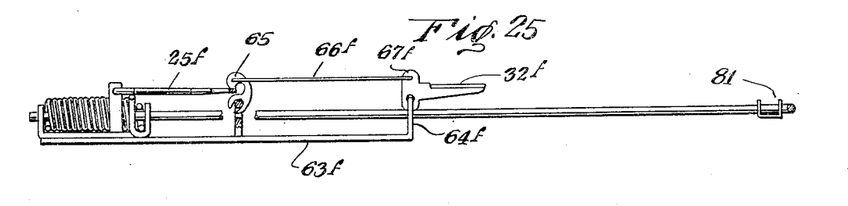
Fig. 25 is a section taken on the line 25—25 of Fig. 24.
Figure 26:
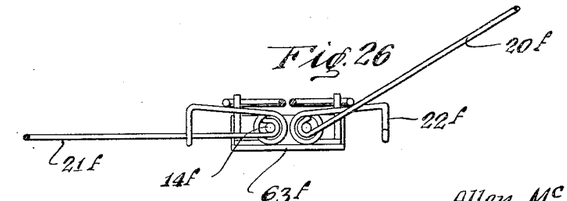
Fig. 26 is a fragmentary section taken on the line 26—26 of Fig. 24.

Figs. 24–26 show a device which, suitable for trapping small animals without injury, includes a base 10f on which torsion springs 22f operate a wire dog 25f for closing jaws 20f, 21f. The rear angularly turned ends of the wire of the dog, at the ears 24f releasably retain the terminals of the springs 22f in position. While the wires of these jaws are so formed as to provide rods 14f, 15f for the torsion springs, the base 63f terminates in a bridge piece 64f on which an operating lever having a pan 32f is positioned. These jaws, including their base portions, or the continuations of the rods 14f, 15f, constitute frames. A link 66f connects the terminal of the operating lever with trigger member 65f, so that the operating lever and its pan is positioned about the center of the device. While the forward part of the jaws or frames are movable in a keeper 81, rings 82 connect to said jaws a wire mesh screen which includes rings 83 and connecting rings 84. Both sides or screens are formed alike, and the said screens and their jaws are freely movable when the trap is set, as becomes apparent on viewing Figs. 24 and 26.

Fig. 14 shows one of a pair of torsion springs 122 which, in practice, are of very strong wire, and suitable for a trap for large animals, scuch as that fragmentarily shown in Fig. 11. In this case the wire dog 125, carried on ears 124 holds a spring terminal 129 in place, but owing to the strength of the torsion spring, a releasable locking member 85, pivoted at 85' is necessary to hold the terminal 129 restrained. When the dog 125 is released by the animal stepping upon the pan, the end portion 125' of said dog will swing rearwardly to the position shown in full lines in Fig. 14. This will release the locking member 85 and the terminal portion 129 is then able to force itself past the rounded shoulder 86. This construction is desirable because of the force of the spring, which would otherwise necessitate very heavy pressure upon the pan in order to spring the trap.

When the trap shown Fig. 24 is operated by one animal of the small type, such as a weasel or muskrat, with others inside, baby animals that may also be inside escape through the rings 83. As it is also frequently desirable to freely release some adult animals, usually females, such release is effected by first securing the limbs of the selected or male animals, through the rings, and then tying or manually holding these limbs. On the opening of the trap, the animals with free limbs may leave, following which the trap is closed to retain the selected animals.

The hereinbefore described construction admits of considerable modification without departing from the invention; therefore, it is the wish not to be limited to the precise arrangements shown and described, which are as aforesaid, by way of illustration merely. In other words, the scope of protection contemplated is to be taken solely from the appended claims, interpreted as broadly as is consistent with the prior art.

What is claimed is:

1. An animal trap comprising a base having front and rear flanges, a pair of rods carried by said flanges, a pair of pivots carried by said front flange, ears carried by said base adjacent said front flange, a hinge pin, arms pivoted on said rods and swingable between open and closed positions, springs mounted on said rods and terminally urging said arms, a pair of jaws movably mounted on said pivots and seated on said arms, a dog swingably mounted on said ears and retaining said arms in an open position against the action of said springs, and an operating lever hingedly mounted on said pin and having thereon a finger, said finger slidably contacting with said dog, whereby on operation of said lever, said dog is swingable for releasing said springs to urge said arms into the closed position, thereby also closing said jaws.

2. An animal trap comprising a base having front and rear flanges, a pair of rods carried by said flanges, pivots carried by said front flange, ears mounted on said base adjacent said front flange, a hinge pin, a pair of jaws mounted on said pivots and movable between open and closed positions, spring means mounted on said rods and having terminals below said jaws for moving the latter, a dog swingably mounted on said ears and releasably retaining said jaws in the open position, and an operating lever hingedly mounted on said pin and including a finger, said finger slidably contacting with said dog, whereby on operation of said lever said dog is swingable for releasing said springs to move said jaws to the closed position.

3. An animal trap comprising a base having front and rear flanges, a pair of rods carried by said flanges, pivots carried by said front flange, ears mounted on said base, a hinge pin, arms pivoted on said rods and swingable between open and closed positions, springs mounted on said rods and having terminals engaged in urging relation to said arms, a dog swingably mounted on said ears and releasably retaining said arms in an open position, a lever hinged on said pin for operating said dog, and jaws mounted on said pivots and freely resting on said arms, whereby on operation of said lever said springs swingably move said arms and said jaws to the closed position.

4. An animal trap comprising a base, a pair of rods carried by said base, a pair of pivots also carried by said base, a spring mounted on each of said rods, a pair of arms also mounted on said rods and swingable between open and closed positions, terminals on said springs and disposed below said arms for swinging said arms, a dog swingably mounted on said base and releasably retaining said arms in an open position, jaws mounted on said pivots and freely resting on said arms, terminal guards carried by said jaws, a hinge pin, and an operating lever mounted on said pin and releasably retaining said dog, whereby on operation of said lever to release said dog said terminals swing said arms and said jaws to a closed position.

5. An animal trap comprising a base having a pair of rods thereon, arms pivoted on said rods and swingable between open and closed positions, a dog swingably mounted on said base for releasably retaining said arms in an open position, said dog having an aperture therein, a hinge pin, a lever mounted on said pin, and a finger carried on said lever and engageable in said aperture for releasably locking said dog, thereby holding said arms in an open position.

6. An animal trap comprising a base having a pair of rods thereon, arms pivoted on said rods and swingable between open and closed positions, pivots carried by said base, jaws mounted on said pivots and freely resting on said arms, a pair of ears carried by said base, a dog swingably mounted on said ears for releasably retaining said arms in an open position, said dog having an aperture therein, a hinge pin, a lever mounted on said pin, and a finger carried on said lever and engageable in said aperture for releasably locking said dog against swinging movement, thereby also holding said arms in an open position.

7. In an animal trap comprising a base having a pair of arms swingably mounted thereon, said arms being movable to a closed position, spring means mounted on said base and urging said arms in the closed position, and a pair of jaws also swingably mounted on said base and movable into a closed position between said arms, said jaws having notches therein adjacent the terminals of said arms, whereby said terminals engage in said notches to retain said jaws in the closed position.

8. In an animal trap comprising a base having a pair of arms swingably mounted thereon, jaw terminals also swingably mounted on said base and freely resting on said arms, spring means mounted on said base and having a pair of terminals disposed below said arms for swinging the latter, and jaws mounted on said terminals.

9. In an animal trap comprising a base having front and rear flanges, rods carried by said flanges, pivots carried by said front flanges, ears carried by said base, a hinge pin, arms pivoted on said rods and swingable between open and closed positions, springs mounted on said rods and urging said arms, jaw terminals mounted on said pivots and freely seated on said arms, a jaw for each terminal, fastening elements attaching said jaws and said terminals, a dog swingably mounted on said ears and retaining said arms in an open position against the action of said springs, an operating lever hingedly mounted on said pin and having thereon a finger, said finger slidable on said dog, whereby on operation of said lever said dog is swingable for releasing said springs to urge said arms and said jaws into a closed position.

10. An animal trap comprising a base, a pair of rods carried by said base, a pair of pivots also carried by said base, a base extension having a flange thereon, a pair of jaws terminally mounted on said pivots and on said flange and swingable between open and closed positions, a pair of arms movably mounted on said rods and contacting with said jaws, and springs also mounted on said rods and urging said arms for moving the latter to swing said jaws from an open to a closed position.

11. In an animal trap comprising a pair of swingable jaw terminals, stops carried by said terminals, a pair of jaws turnably carried by said terminals and having pins thereon, spring means for turning said jaws, said pins contacting with said stops to normally hold said jaws against turning movement, said jaws, on swinging movement of said terminals, adapted to strike an animal for releasing said pins, whereon said jaws are turnable, and auxiliary jaws carried by said first jaws for striking an animal during the turning movement.

12. An animal trap comprising a base, jaws swingable between open and closed positions, rods mounted in said base, spring means mounted on said rods and having terminals for swinging said jaws, a pair of ears on said base, a releasable dog swingably mounted in said ears and having a pair of terminals engaging the terminals of said springs, said jaws being in the open position, and means including a trigger for releasing said dog, whereby said springs are effective to swing said jaws to the closed position.

13. An animal trap comprising a base and an extension for the latter, a pair of frames mounted on said base and swingable between open and closed positions, spring means mounted on said base and having a pair of terminals for swinging said frames, a swingable dog having a pair of terminals releasably engaging said first terminals in the open position of said frames, means normally retaining said dog against swinging movement, said means including an operating lever, which latter is positioned on said extension between said frames, and screens carried on said frames for accommodating animals thereon, whereby on operation of said lever said dog is effective to release the terminals of said springs for swinging said frames to the closed position to trap the animals, said lever being operable by one of the animals.

In testimony whereof I hereby affix my signature.

ALLEN McMULLEN.